United States Patent [19]

Giles

[11] 4,212,653
[45] Jul. 15, 1980

[54] PROCESS AND APPARATUS FOR SEPARATING PARTICULATE MATTER FROM GASEOUS MEDIA

[75] Inventor: Walter B. Giles, Glenville, N.Y.

[73] Assignee: General Electric Company, Schenectady, N.Y.

[21] Appl. No.: 919,460

[22] Filed: Jun. 27, 1978

[51] Int. Cl.² .................................................. B01D 45/16
[52] U.S. Cl. ........................................ 55/1; 55/261; 55/426; 55/459 B; 209/144
[58] Field of Search .................. 55/1, 261, 266, 392, 55/426, 459 R, 459 B; 210/512 R; 209/144

[56] References Cited

U.S. PATENT DOCUMENTS

| | | | |
|---|---|---|---|
| 1,509,911 | 9/1924 | Stebbins | 55/426 |
| 2,967,618 | 1/1961 | Vane | 55/459 R |
| 3,039,406 | 6/1962 | Aref | 110/28 |
| 3,064,811 | 11/1962 | Mumper | 55/261 |
| 3,150,943 | 9/1964 | Darrow et al. | 55/261 |
| 3,675,401 | 7/1972 | Cordes | 55/426 |
| 3,855,951 | 12/1974 | Giles | 110/8 R |
| 4,089,631 | 5/1978 | Giles | 431/9 |

FOREIGN PATENT DOCUMENTS

| | | | |
|---|---|---|---|
| 920901 | 10/1954 | Fed. Rep. of Germany | 55/261 |
| 2536360 | 2/1976 | Fed. Rep. of Germany | 55/261 |
| 2548948 | 5/1976 | Fed. Rep. of Germany | 55/261 |
| 470311 | 8/1975 | U.S.S.R. | 55/261 |

Primary Examiner—David L. Lacey
Attorney, Agent, or Firm—Richard G. Jackson; James C. Davis, Jr.; Paul R. Webb, II

[57] ABSTRACT

A process for separating particulate matter from a contaminated gaseous medium includes employing a swirling substantially contaminant-free gaseous medium between a zone for introducing the contaminated medium into a cyclonic separator zone and a product gas exhaust zone which extends into the separation zone. Apparatus suitable for carrying out the process is also described.

9 Claims, 3 Drawing Figures

PROCESS AND APPARATUS FOR SEPARATING PARTICULATE MATTER FROM GASEOUS MEDIA

The present invention relates to a process for separating particulate matter from gaseous media containing the particulate matter therein.

CROSS REFERENCE TO RELATED APPLICATION

Reference is made to allowed copending application of Walter B. Giles, Ser. No. 725,696, filed Sept. 23, 1976, assigned to the assignee hereof and incorporated herein by reference. In part, briefly stated, that application describes and claims a cyclone combustor comprising, inter alia, means for introducing solid fuel in ground fluidized form at the top of a combustion chamber directed tangentially into the chamber and means for introducing air at the top of the chamber directed tangentially into the chamber radially inward of where the solid fuel is introduced.

BACKGROUND OF THE INVENTION

Aref, U.S. Pat. No. 3,039,406, describes a cyclone furnace wherein, as shown in FIG. 2 thereof, the outlets of vertically spaced air nozzles are located at the same radial distance from the longitudinal axis of the furnace.

Giles, U.S. Pat. No. 3,855,951, describes a cyclone separator which burns and separates tangentially-admitted gas-borne solid waste.

Neither of the foregoing patents describes the present invention.

Processes for separating particulate matter from contaminated gaseous media are well known. In one such process, a contaminated gaseous medium containing particulate matter is passed through a swirl-inducing zone. The resulting swirling gaseous medium is thereafter introduced into a cyclonic separation zone adjacent the inner surface of the zone to (i) separate at least a portion of the particulate matter from the contaminated gaseous medium and (ii) form a gaseous product which is at least partially depleted in the particulate matter. The gaseous product is thereafter removed from the separation zone through an exhaust flow zone disposed radially inwardly of the swirl-inducing zone. It is also known that the foregoing steps can be carried out continuously and simultaneously, whereby the process can be carried out continuously. However, the process described above has not been entirely satisfactory from the standpoint of separation efficiency.

It has now been found that substantial increases in separation efficiency of the above-described separation process are obtained by practice of this invention which provides an improvement of the process. In the improvement, a substantially contaminant-free gaseous medium is employed between the zone for introduction of the contaminated gaseous medium and the exhaust flow zone.

DESCRIPTION OF THE INVENTION

Generally stated, in the above process, the present invention provides an improvement for increasing separation efficiency. Generally stated, the improvement includes:

(A) passing a substantially contaminant-free gaseous medium through an additional swirl-inducing zone to form a co-swirling mass thereof, and (B) introducing the co-swirling gaseous medium into the separation zone through an introduction zone disposed radially inwardly of the swirling contaminated gaseous medium and radially outwardly of the exhaust flow zone.

Although it is not intended to be bound by any theory of operation, it is believed that the increased separation efficiency obtained by the improvement of this invention is effected by a shielding action provided by the co-swirling substantially contaminant-free gaseous medium. Under this theory, the shielding action operates to at least substantially reduce eddy currents of the contaminant-bearing gaseous medium developed in the introduction zone thereof adjacent the exhaust flow zone and resulting by-pass of the separation zone by the particulate matter in the introduced gaseous medium.

BRIEF DESCRIPTION OF THE DRAWING

This invention will be better understood from the following detailed description taken with the accompanying drawing wherein like numerals refer to similar elements throughout and.

DETAILED DESCRIPTION OF THE INVENTION AND MANNER AND PROCESS OF MAKING AND USING IT

Figure 1:
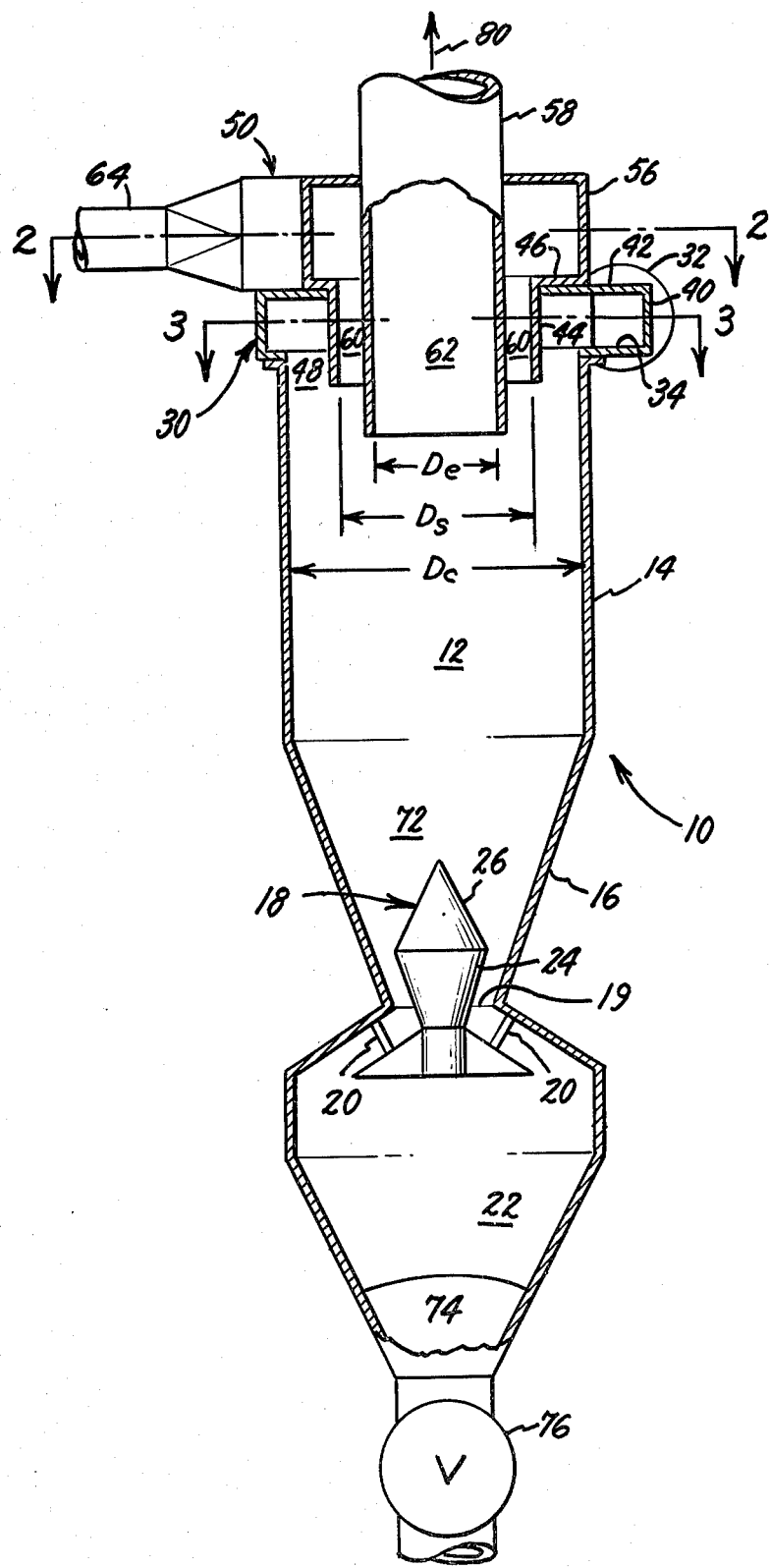
FIG. 1 is an elevation view of a reverse flow cyclonic separator suitable for carrying out the process of this invention.

Referring now to the drawing, especially FIG. 1, there is shown reverse flow cyclonic separator 10 illustrating the best apparatus contemplated for carrying out the present invention. The separator includes a vertically oriented separation chamber 12 preferably characterized with a ratio of axial length to maximum diameter of about 3:1 to about 4:1. The chamber is defined peripherally by a composite conical-cylindrical wall including cylindrical wall portion 14 defining an upper region of the chamber and depending conical wall portion 16 defining a lower region of the chamber. Base plug 18 is disposed generally at the bottom of the chamber in coaxial relationship with opening 19 formed in the minimum diameter region of the chamber. The base plug is supported by a plurality of supports 20 which are secured at first ends thereof to the plug and at opposite ends thereof to the wall of dust collection hopper 22, which is joined to the separation chamber at opening 19 thereof. The base plug preferably includes frusto-conical-shaped intermediate portion 24 which is tapered downwardly through the opening in generally parallel relationship with conical wall 16 from which the intermediate portion is inwardly spaced, thereby providing a clearance or flow path for particulate matter being removed as explained below. Disposed atop the intermediate portion is upwardly tapering portion 26 having a generally conical surface. The base plug is also called a vortex shield.

Mounted atop chamber wall 14 is generally annular inlet scroll assembly 30 which is connected at an inlet end thereof to inlet conduit 32 for receiving a contaminated gaseous medium containing particulate matter from a source thereof. The contaminated gaseous medium may be, for example, air or other gas which bears particulate matter such as dust or the like to be removed. Scroll assembly 30 includes scroll-like floor 34 (FIGS. 1 and 3), which may be generally horizontal. The floor 34 has a radially inner edge 36 which is vertically aligned with the inner cylindrical surface of chamber wall 14, i.e. edge 36 is generally circular. Floor 34 has a radially outer edge 38 which is generally spiral in shape and defined by the intersection of the floor surface with preferably upright wall 40 which defines the outer boundary of scroll assembly 30 throughout the scroll-shaped portion thereof.

Scroll assembly 30 includes upper wall portion 42 which is generally parallel to floor 34 and extends radially further inward relative thereto. The inner end of wall 42 may abut, and preferably forms a gas-tight seal with, upright wall portion 44 depending from floor 46 of scroll assembly 50 which is coaxially mounted atop scroll assembly 30. Scroll assembly 30, chamber wall 14 and depending wall 44 define introduction zone 48 of generally annular shape bounded on its radially inner and outer ends by these generally cylindrical walls for introducing swirling contaminated gaseous medium generated in scroll assembly 30 into chamber 12 adjacent the outer surface of the chamber, that is, adjacent the inner surface of wall 14 thereof. Alternately stated, the introduction zone 4B serves to introduce the swirling contaminated gaseous medium into the separation chamber 12 via a path adjacent the inner surface of the wall 14 which defines a periphery of the separation chamber.

Scroll assembly 50 is of generally annular shape with its floor 46 disposed atop upper wall 42 of scroll assembly 30. Floor 46 (best illustrated with horizontally extending shading lines in FIG. 2) has circular inner edge 52 and spirally shaped outer edge 54 defined by the intersection of the floor with spiral wall 56. Circular inner floor edge 52 is defined by the juncture of the inner surface of depending wall 44 with floor 46. This floor is the lower surface of a swirl-inducing zone employed in the present process for inducing swirl of a substantially contaminant-free gaseous medium. The inner surface of generally cylindrical upright wall 44 and the outer surface of the generally cylindrical wall defining exhaust conduit 58 define annular zone 60, open at its upper and lower ends, which zone is disposed radially inwardly of the swirl zone defined by scroll assembly 30 for inducing swirl in a contaminated gaseous medium and radially outwardly of the exhaust flow zone 62 defined by the inner surface of exhaust conduit 58. Scroll assembly 50 is connected to and in flow communication at one end thereof with inlet conduit 64, which in turn is connected by means not shown to a source of substantially contaminant-free gaseous medium. For simplicity of description the contaminated gaseous medium and the substantially contaminant-free gaseous medium are hereinafter referred to as dirty gas and clean gas, respectively.

In carrying out the present process for separating particulate matter from the dirty gas containing the particulate matter therein, the dirty gas is admitted, preferably in continuous manner, through conduit 32 into the swirl-inducing zone defined by scroll assembly 30. (The dirty gas 66 being admitted is schematically illustrated by arrow 66 in FIGS. 2 and 3.) The dirty gas is admitted to scroll assembly 30 under pressure, as by a blower if needed, and flows in a circumferential or tangential direction as shown in the sectional plan view of FIG. 3 by heavy arrows 68 which are superimposed on scroll floor 34. The swirling dirty gas, which is swirling in the clockwise direction in FIG. 3, spills over edge 36 of the floor 34 as shown by light arrows 70 into introduction zone 48. While continuing to swirl the swirling dirty gas flows axially downward through zone 48, whereby the swirling dirty gas is introduced into separation chamber 12 adjacent the inner surface of cylindrical wall 14 thereof. The flow of the dirty gas thus introduced passes in a circumferentially and axially downward direction within separation chamber 12 to base region 72 adjacent the conical surface 26 of base plug 18. In this region the flow of the dirty gas is reversed and proceeds in a spiral manner upwardly near the vertical axis of the chamber. The centrifugal forces developed on the particulates or particles contained in the dirty gas admitted into the chamber result in separation of at least a portion of the particles from the dirty gas. Downward flow of the gas is accompanied by radially inward flow thereof. The separated particles flow generally down the walls of the chamber and pass through opening 19 and ultimately accumulate in dust collection hopper 22 as illustrated by accumulation 74. When desired, the accumulation of particles may be discharged through the discharge line having valve 76 therein by means well-known in the art. The upwardly flowing dirty gas, now at least partially depleted in the particulate matter, exits from the separation chamber through exhaust flow zone 62 defined by exhaust conduit 58.

As indicated above, in the improved process of this invention a substantially contaminant-free gaseous medium (indicated by arrow 78 associated with inlet conduit 64) is employed between zone 48 (employed for introduction of the dirty gas medium) and exhaust flow zone 62. This results in increased efficiency of the separation process, i.e. the amount of particulate matter in product gas exiting the separation zone or chamber 12 via the exhaust flow zone as indicated by arrow 80 (FIG. 1) may be substantially less in comparison to the amount obtaining in similar processes except not including employment of clean gas as herein taught.

Figure 2:
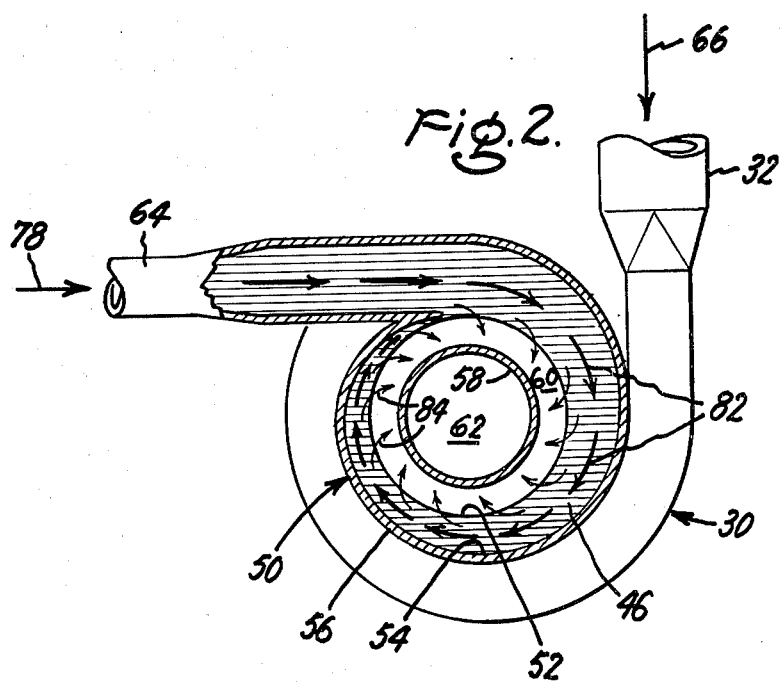
FIG. 2 is a sectional view taken on line 2—2 of FIG. 1 wherein the heavy-lined arrows illustrate passage of a contaminated gaseous medium through a swirl-inducing zone and the light arrows illustrate the introduction of the resulting swirl into the separation zone.
Figure 3:
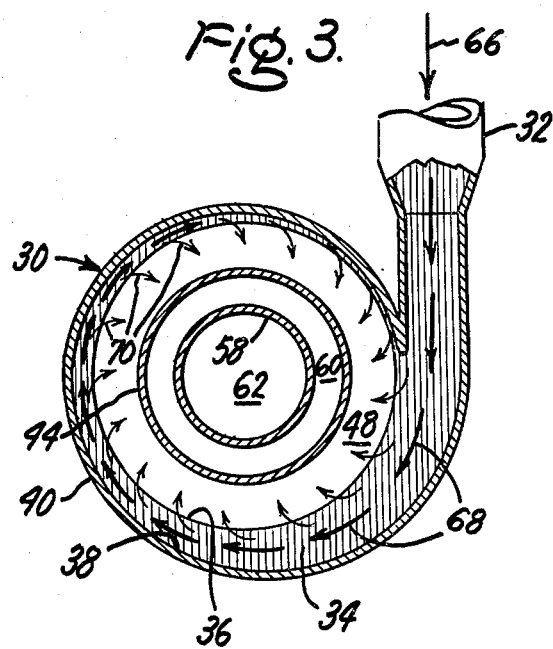
FIG. 3 is a sectional view taken on line 3—3 of FIG. 1 wherein the heavy-lined arrows illustrate passage of a substantially contaminant-free gaseous medium through a co-swirling zone and the light-lined arrows illustrate introduction of the resulting swirl intermediate an exhaust flow zone and the first-mentioned swirl introduction zone.

In order to achieve the advantages provided by this invention, clean gas 78 is admitted through inlet conduit 64 into the second swirl-inducing zone defined by scroll assembly 50. The clean gas is admitted under a suitable pressure differential between inlet conduit 64 and exhaust conduit 58 by either employing a pressurized clean-air source or a suction on the exhaust conduit or a combination of both of the foregoing. Under this pressure differential the clean gas passes through the second swirl-inducing zone to form a co-swirling clean gas as indicated by heavy flow arrows 82 (FIG. 2) which are superimposed on floor 46 of scroll assembly 30. (As used herein, the term "co-swirling" means that the swirling clean and dirty gas media are swirling in the same circumferential direction, for example, clockwise for each medium as shown in FIGS. 2 and 3.) The co-swirling clean gas spills over circular inner edge 52 of floor 46 as shown by light arrows 84, the co-swirling clean gas thereby taking on an axially downward directional flow component. Thus, the still swirling clean gas is introduced into separation chamber 12 through introduction zone 60, i.e. the cylindrically annular region defined by wall 44 and exhaust conduit 58, with the zone being disposed radially inwardly of the swirling dirty gas and radially outwardly of the exhaust flow zone 62. The flow of the clean gas is conducted concurrently or simultaneously with the flow of the dirty gas from which particulate matter is to be separated in the separation chamber. Preferably, the clean and dirty gas flows are both conducted in a continuous manner.

The downward flow of the swirling clean gas introduced into the separation chamber is believed to provide a shielding action which operates to at least substantially reduce eddy currents which may be introduced in the dirty gaseous medium in introduction zone 48. These dirty gas eddy currents have been attributed to be the cause of observed bypass of the separation zone by the particulate matter or a portion thereof contained in the introduced dirty gas when a clean gas is not employed as herein taught. Such bypassing or short circuiting of particulate matter from the dirty gas introduction zone to the product gas exhaust zone is overcome to a substantial extent by this invention in simple efficient manner.

For best results, the mass flow rate of the clean gas is at least 20 percent by weight of the combined mass flow rate of the clean gas and the mass flow rate of the dirty gas. More preferably the mass flow rate of the clean gas is at least eighty percent of the foregoing combined mass flow rate. At the foregoing at least eight percent flow condition, it is found that the amount of particulate matter in the product gas is less than 20% of the amount of the particulate matter obtaining therein at the same operating conditions except omitting the step of introducing clean gas as herein taught. Where the mass flow rate of clean gas is at least 20% of the combined clean and dirty gas mass flow rates, it is found that the amount of particulate matter in the product gas is less than 50 wt.% of the amount of the particulate matter obtaining therein at the same operating conditions except omitting the step of introducing clean gas.

Although the present process may be carried out in any suitable apparatus, including for example an axial flow cyclone separator, a reverse flow cyclone such as that illustrated in the drawing is generally preferred for defining the separation zone.

Preferably, the swirling and co-swirling gas media are characterized or provided with directional flow components which are co-directional and generally parallel to the axis of the cyclonic separation zone employed. In other words, the axial flows of the co-swirling gas media are preferably co-current. In a number of applications it is critical that such co-current or co-directional axial flow relationship of the co-swirling gaseous media is provided.

The swirling dirty gas is preferably introduced into separation chamber 12 in a principally axial direction. Wall 44 preferably extends a sufficient distance downwardly beyond floor 34 to ensure that such introduction is effected. Such distance may be readily determined for a selected set of operating conditions by routine experimentation. A suitable value for such distance may be, for example, at least 50% of the value of the radial distance from the outer surface of wall 44 to the inner surface of wall 14, and preferably at least 100% of the latter value.

In general, the lower end of exhaust conduit 58 (and of zone 62) should be at least as low as floor 46. Desirably it extends downwardly beyond the lower end of wall 44, preferably (as illustrated) by an amount at least equal to the radial distance between the outer surface of exhaust conduit 58 and the inner surface of upright wall 44.

The swirling clean and dirty gases are preferably introduced into the separation zone at approximately equal axial flow velocities in order to enhance the beneficial effects of the clean gas. Such velocity relationship can readily be achieved by appropriate selection of inlet pressures for the clean and dirty gases and the values in the ratio of $D_c:D_s:D_e$, wherein $D_c$ is the inside diameter of the separation chamber, $D_s$ is the inside diameter of wall 44, and $D_e$ is the inside diameter of the exhaust conduit. For example, where the inlet pressures are substantially equal and the clean gas mass flow rate is selected to be about 33% of the combined mass flow rate of the clean and dirty gases, the $D_c:D_s:D_e$ ratio will preferably be (in like linear units) about 2:1.4:1, wherein the thicknesses of wall 44 and the wall of exhaust conduit 58 are each less than about five percent of the diameters $D_s$ and $D_e$, respectively.

The present process is especially advantageous for improved cyclonic separation of at least a portion of particulate contaminants from a dirty gas stream wherein the particules are relatively minute, e.g. up to about ten microns in diameter.

BEST MODE CONTEMPLATED

The apparatus herein described may be made using well-known construction techniques for making cyclonic separators. The particular materials employed will be selected to best accomodate the cost of construction and durability required for a given application. In general, the various components of the apparatus may be of steel. The best mode contemplated at the time of executing this patent application for carrying out the present process has been set forth in the foregoing description, including but not limited to preferred mass flow rates, particle sizes, and relative dimensions of the various zones employed.

It is to be understood that the foregoing detailed description is given merely by way of illustration and at numerous modifications may be made therein without departing from the spirit or scope of this invention.

What is claimed is:

1. In a process for separating particulate matter from a contaminated gaseous medium containing said particulate matter therein, comprising:
   (A) passing said contaminated gaseous medium through a first swirl-inducing zone to form a swirling contaminated gaseous medium,
   (B) introducing said swirling contaminated gaseous medium into a cyclonic separation zone via a path adjacent an inner surface of a wall defining a periphery of said separation zone to separate at least a portion of said particulate matter from said swirling contaminated gaseous medium and form a gaseous product which is at least partially depleted in said particulate matter, and
   (C) removing said gaseous product from said separation zone through a gaseous exhaust flow zone disposed radially inwardly of said first swirl-inducing zone, the improvement for increasing separation efficiency, which comprises:

(D) passing a substantially contaminant-free gaseous medium through a second swirl-inducing zone to form a co-swirling substantially contaminant-free gaseous medium, (E) introducing said co-swirling gaseous medium into said separation zone through an introduction zone disposed radially inwardly of said swirling contaminated gaseous medium and radially outwardly of said exhaust flow zone, and (F) employing an additional wall to separate said introduction zone from the so-introduced swirling contaminated gaseous medium, said additional wall extending into said separation zone, said exhaust flow zone extending into said separation zone further than said additional wall so extends, such that separation of the introduced co-swirling contaminated gaseous medium from the introduced swirling substantially contaminant-free gaseous medium is terminated before the swirling contaminated gaseous medium has passed said exhaust flow zone.

2. The process of claim 1 wherein said substantially contaminant-free gaseous medium is introduced in step (e) at a mass flow rate of at least 20% by weight of the combined mass flow rate of said contaminated gaseous medium plus said contaminant-free gaseous medium.

3. The process of claim 1 wherein said swirling and said co-swirling gaseous mediums are provided with respective directional flow components which are co-directional and generally parallel to an axis of said cyclonic separation zone.

4. The process of claim 1 wherein said contaminant-free gaseous medium is introduced in step (e) at a mass flow rate of at least 80% of the combined mass flow rate of said contaminated gaseous medium plus said contaminant-free gaseous medium.

5. The process of claim 1 wherein said separation zone is defined by a reverse flow cyclone.

6. The process of claim 1 wherein said swirling and said co-swirling gaseous mediums are introduced at approximately equal axial flow velocities.

7. In an apparatus for separating particulate matter from a contaminated gaseous medium containing said particulate matter therein, comprising:

(A) means for passing said contaminated gaseous medium through a first swirl-inducing chamber to form a swirling contaminated gaseous medium, (B) means for introducing said swirling contaminated gaseous medium into a cyclonic separation chamber via a path adjacent an inner surface of a wall defining a periphery of said separation chamber to separate at least a portion of said particulate matter from said swirling contaminated gaseous medium and form a gaseous product which is at least partially depleted in said particulate matter, and (C) means for removing said gaseous product from said separation chamber through a gaseous exhaust flow conduit disposed radially inwardly of said first swirl-inducing chamber, the improvement for increasing separation efficiency, which comprises:

(D) means for passing a substantially contaminant-free gaseous medium through a second swirl-inducing chamber to form a co-swirling substantially contaminant-free gaseous medium, and (E) means for introducing said co-swirling gaseous medium into said separation chamber through an introduction chamber disposed radially inwardly of said swirling contaminated gaseous medium and radially outwardly of said exhaust flow conduit, and wherein:

(a) said introduction chamber is an annular chamber defined by the outer surface of said exhaust conduit and an additional wall disposed intermediate said outer surface of said exhaust conduit and the inner surface of the wall defining said periphery of said separation chamber, and (b) said exhaust conduit extends into said separation chamber further than said additional wall so extends.

8. The apparatus of claim 7, further comprising a base plug disposed generally at the bottom of said separation zone in coaxial relationship with a discharge opening formed therein.

9. The apparatus of claim 8, wherein said separation zone is defined peripherally by a composite conical-cylindrical wall including a cylindrical wall portion defining an upper region of said separation zone and a conical wall portion depending from said cylindrical wall portion and defining a lower region of said separation zone, said base plug including (i) a frusto-conical portion tapered downwardly through said opening in generally parallel relationship with said conical portion and (ii) an upwardly tapering portion disposed atop said frusto-conical portion and having a generally conical surface, said frusto-conical portion of said base plug being spaced inwardly from said conical wall portion of said separation zone-defining wall.

* * * * *